(12) United States Patent
Wen et al.

(10) Patent No.: US 10,378,965 B2
(45) Date of Patent: Aug. 13, 2019

(54) SYSTEMS AND METHODS FOR MONITORING TEMPERATURE OF ELECTRICAL CONDUCTOR

(71) Applicants: 3M INNOVATIVE PROPERTIES COMPANY, St. Paul, MN (US); Zhiguo Wen, Shanghai (CN)

(72) Inventors: Zhiguo Wen, Shanghai (CN); Zheng Huang, Shanghai (CN); Sihua Yuan, Shanghai (CN); Xuetao Yu, Shanghai (CN); Ming Zhang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 415 days.

(21) Appl. No.: 15/021,290

(22) PCT Filed: Sep. 11, 2013

(86) PCT No.: PCT/CN2013/083303
§ 371 (c)(1),
(2) Date: Mar. 11, 2016

(87) PCT Pub. No.: WO2015/035568
PCT Pub. Date: Mar. 19, 2015

(65) Prior Publication Data
US 2016/0223406 A1 Aug. 4, 2016

(51) Int. Cl.
*G01K 7/00* (2006.01)
*G01K 1/02* (2006.01)

(52) U.S. Cl.
CPC ............... *G01K 1/024* (2013.01); *G01K 7/00* (2013.01); *G01K 2215/00* (2013.01)

(58) Field of Classification Search
CPC combination set(s) only.
See application file for complete search history.

(56) References Cited

U.S. PATENT DOCUMENTS 4,855,671 A   8/1989   Fernandes 7,158,012 B2 *  1/2007  Wiesman .................. H04B 3/56
                                                        324/126

(Continued)

FOREIGN PATENT DOCUMENTS

CN   101319938    4/2010
CN   101666686    11/2011

(Continued)

OTHER PUBLICATIONS

International Search Report for PCT International Application No. PCT/CN2013/0833303, dated Jun. 11, 2014, 5pgs.

(Continued)

*Primary Examiner* — Lisa M Caputo
*Assistant Examiner* — Nasir U. Ahmed
(74) *Attorney, Agent, or Firm* — Gregg H. Rosenblatt

(57) ABSTRACT

A system (100) for monitoring a temperature of an electrical conductor of an electrical cable and including a temperature sensor unit (100a) and a transceiver unit (100b). The temperature sensor unit (100a) is located inside the first (semi) conductive layer and includes a micro-controller (120), a temperature sensor (110), an energy harvest sub-unit (140) and a wireless transmitter layer (130). The temperature sensor (110) is adapted to detect a first signal (S1) representing temperature of the electrical conductor and to supply the first signal (S1) to the micro-controller (120). The transceiver unit (100b) is located outside the first (semi) conductive layer and includes an energy transmitter (160) and a wireless receiver (150). The energy harvest sub-unit (140) is adapted to harvest electromagnetic power from the energy transmitter (160) and to provide electrical power to the micro-controller (120). The wireless transmitter (130) is adapted to being engaged with the wireless receiver (150) under the control of the micro-controller (120) to transmit a second signal (S2) converted from the first signal (S1) to the wireless receiver (150). The energy harvest sub-unit (140) and the wireless transmitter (130) are designed to have different working frequency.

11 Claims, 2 Drawing Sheets

(56) References Cited

U.S. PATENT DOCUMENTS

| | | |
|---|---|---|
| 7,561,035 B2 | 7/2009 | Sahashi et al. |
| 9,304,047 B2 | 4/2016 | Huang et al. |
| 2010/0177801 A1 | 7/2010 | Geren |
| 2012/0114013 A1* | 5/2012 | Tsuchida .............. G01K 13/002 |
| | | 374/185 |
| 2012/0235636 A1* | 9/2012 | Partovi .................. H02J 7/025 |
| | | 320/108 |

FOREIGN PATENT DOCUMENTS

| | | |
|---|---|---|
| CN | 102636686 | 8/2012 |
| CN | 102175341 | 11/2013 |
| JP | 7111757 B4 | 11/1995 |
| JP | 2004127276 A2 | 4/2004 |
| JP | 2009053025 A2 | 3/2009 |
| WO | WO 2005-072166 | 8/2005 |
| WO | WO 2014-176784 | 11/2014 |

OTHER PUBLICATIONS

Chinese Search Report for Application No. 201380079425.X, dated Jan. 10, 2018, 2pgs.
Japanese Notice of Allowance for Application No. 2016-541752, dated Mar. 27, 2018, 3pgs.

* cited by examiner

SYSTEMS AND METHODS FOR MONITORING TEMPERATURE OF ELECTRICAL CONDUCTOR

FIELD OF THE INVENTION

The present invention generally relates to systems and methods for monitoring temperature of an electrical conductor, and in particular, to systems and methods for monitoring temperature of an electrical conductor enclosed in at least a (semi)conductive layer, for example, an electrical conductor of an electrical power cable in a high voltage power distribution system.

BACKGROUND OF THE INVENTION

High voltage power distribution systems play an important role in modern society. Safety and security are always considerable factors for the "health" of such high voltage power distribution systems. Accordingly, there should be a technology that enables monitoring of the "health" of the high voltage power distribution system.

In a high voltage power distribution system, the temperature of conductors of electrical cables will increase as currents carried by the cables increase. Accordingly, the "health" of such a system can be assessed by monitoring the temperature of the on-line electrical conductor, for example, at the cable splices or the junctions, which may be the weak points, in such a system. Usually, normal currents flowing through the cable splices or the junctions may create a temperature of up to about 90 degrees Celsius. If the temperatures of the cable splices or the junctions were to increase beyond that, it could be an indication that something may be wrong in this power distribution system. On the other hand, it is also useful to know if the existing power distribution system is at maximum current carrying capacity, to know if additional power can be reliably distributed with the existing system, or, to know if additional infrastructure expenditures are needed.

On-line power cables, as well as the cable splices and the junctions, in high voltage power distribution systems are typically insulated and protected by a number of insulative and (semi)conductive layers and are commonly buried underground or are high overhead. Therefore, it is not easy to monitor the temperature of the on-line electrical conductor, for example, directly at the cable splices or the junctions.

As used in this specification:

"(semi)conductive" indicates that the layer may be semi-conductive or conductive, depending on the particular construction.

"thermal contact" between two articles means that the articles can exchange energy with each other in the form of heat.

"direct contact" between two articles means physical contact.

FIG. 1 illustrates a type of standard high voltage cable splice assembly 30 in which two sections of an electrical cable 10 are spliced. As shown in FIG. 1, the electrical cable 10 comprises electrical conductor 31, insulation layer 33, and (semi)conductive layer 35. A connector 12 concentrically surrounds the spliced electrical conductor 31. A first (semi)conductive (or electrode) layer 13, for example a metallic layer, concentrically surrounds the spliced electrical conductor 31 and the connector 12, forming a shielding Faraday cage around the connector 12 and electrical conductor 31. An insulating layer 11 (containing geometric stress control elements 16) surrounds the first (semi)conductive layer 13. The foregoing construction is placed inside a second (semi)conductive layer 14, in this case a metallic housing, which functions as a shield and ground layer. A resin 17 is poured into the metallic housing 14 through one of the ports 18 to fill in the area around insulating layer 11. And a shrinkable sleeve layer 15 serves as an outermost layer.

Therefore there is a need to develop a solution to monitor the temperature of an electrical conductor enclosed in at least a (semi)conductive layer, for example, of a high voltage power distribution system.

SUMMARY OF THE INVENTION

According to one aspect of the present disclosure, a system for monitoring a temperature of an electrical conductor enclosed in at least a first (semi)conductive layer is disclosed. The system includes a temperature sensor unit and a transceiver unit. The temperature sensor unit is located inside the first (semi)conductive layer, and includes a micro-controller, a temperature sensor, an energy harvest sub-unit and a wireless transmitter. The temperature sensor is adapted to detect a first signal representing temperature of the electrical conductor and to supply the first signal to the micro-controller. The transceiver unit is located outside the first (semi)conductive layer and includes an energy transmitter and a wireless receiver. The energy harvest sub-unit is adapted to harvest electromagnetic power from the energy transmitter and to provide electrical power to the micro-controller. The wireless transmitter is adapted to being engaged with the wireless receiver under the control of the micro-controller to transmit a second signal converted from the first signal to the wireless receiver. The energy harvest sub-unit and the wireless transmitter are designed to have different working frequency.

According to another aspect of the present disclosure, a method of monitoring temperature of an electrical conductor enclosed in at least a first (semi)conductive layer is disclosed and comprises the steps of:

harvesting electrical power and providing the electrical power to a first micro-controller by an energy harvest sub-unit working on a first working frequency, the first micro-controller and the energy harvest sub-unit located inside the first (semi)conductive layer;

detecting a first signal representing temperature of the electrical conductor by a temperature sensor unit located inside the first (semi)conductive layer;

converting the first signal by the first micro-controller into a second signal applicable of being transmitted via a wireless way;

transmitting the second signal by a wireless transmitter to a wireless receiver located outside the first (semi)conductive layer, the wireless transmitter located inside the first (semi)conductive layer and working on a second working frequency different from the first working frequency.

In some embodiments, ratio of the working frequency of the wireless transmitter to that of the energy harvest sub-unit is larger than 100. For example, the energy harvest sub-unit is designed to have a working frequency in a range from tens of KHz to hundreds of KHz. The wireless transmitter is designed to have a working frequency in a range from tens of MHz to thousands of MHz.

The electrical power harvest and signal transmission of the system can be achieved separately and under different working frequency of dual structure, i.e. the energy harvest sub-unit plus the energy transmitter as one structure and the wireless transmitter plus wireless receiver as another structure. Thus, antenna of the wireless receiver of the transceiver unit has more freedom to be installed and is not required to be installed directly above that antenna of the wireless transmitter; meanwhile good quality of signal transmission can be achieved. So it will be much easier for field installation of the system.

BRIEF DESCRIPTION OF THE DRAWINGS

These and/or other aspects and advantages of the invention will become apparent and more readily appreciated from the following description of the preferred embodiments of the present invention, taken in conjunction with the accompanying drawings of which.

Figure 1:
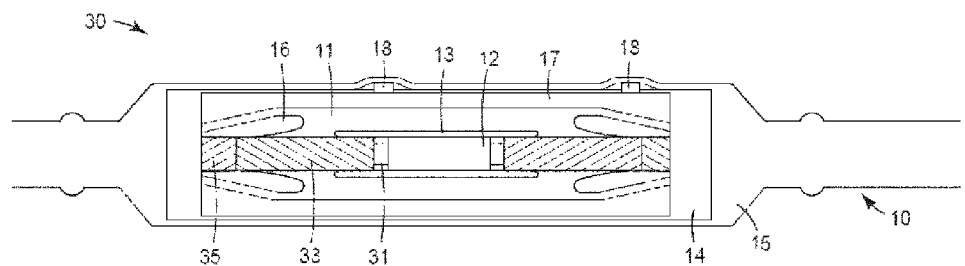
FIG. 1 is a partial cut-away schematic view of a prior art cable splice assembly.

The scope of the present invention will in no way be limited to the simple schematic views of the drawings, the number of constituting components, the materials thereof, the shapes thereof, the relative arrangement thereof, etc., and are disclosed simply as an example of an embodiment.

DETAILED DESCRIPTION OF EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein.

The present disclosure provides embodiments of systems for monitoring a temperature of an electrical conductor of an electrical cable, for example, at a cable splice or junction. In some embodiments, such system is capable of remotely monitoring the temperature of the conductor within the cable. As mentioned above, cable splices or junctions may have the weakest current carrying capacity in a high voltage power distribution system and may have a higher possibility of failing when the current is overloaded. The systems for monitoring a temperature of an electrical conductor according to embodiments of the present invention can be used to monitor the temperature of the electrical conductor located in cable splices or junctions, so that a judgment that the electrical conductor, as well as the cable splices or junctions is working well or not can be made based on the temperature.

Figure 2:
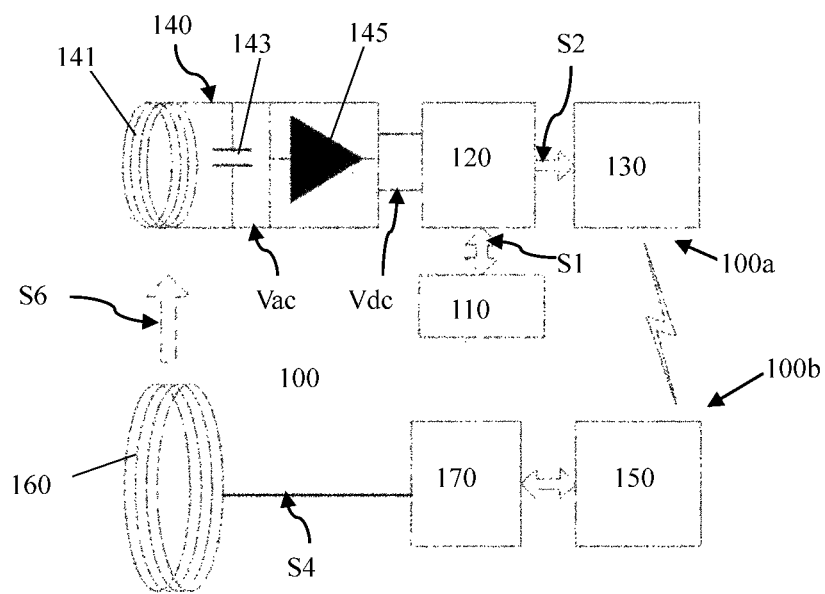
FIG. 2 is a schematic block diagram of a system for monitoring temperature of an electrical conductor according to an embodiment of the present invention.

FIG. 2 is a schematic diagram of a system 100 for monitoring a temperature of an electrical conductor (not shown) enclosed in at least a first (semi)conductive layer according to one embodiment of the present disclosure. Commonly, the first (semi)conductive layer may tightly enclose the electrical conductor and may not allow any port or gap thereon except those ports for the electrical conductor in and out. The system 100 includes a temperature sensor unit 100a and a transceiver unit 100b. The temperature sensor unit 100a is adapted to measure temperature of the electrical conductor and to supply a signal representing the temperature to the transceiver unit 100b. The transceiver unit 100b is adapted to enable the temperature sensor unit 100a to work and to receive the signal and further to determine a temperature of the electrical conductor based on the received signal. The temperature sensor unit 100a is located inside the first (semi)conductive layer, while the transceiver unit 100b is located outside the first (semi) conductive layer.

The temperature sensor unit 100a includes a temperature sensor 110, a micro-controller (hereinafter referred to as "first micro-controller") 120, a wireless transmitter 130 and an energy harvest sub-unit 140. The temperature sensor 110 is adapted to detect a first signal S1 representing temperature of the electrical conductor and to supply the first signal S1 to the first micro-controller 120. The first micro-controller 120 is adapted to control the temperature sensor 110 to work and to receive the first signal S1, and then to process the first signal S1 so as to achieve a second signal S2 applicable of being transmitted by the wireless transmitter 130. The wireless transmitter 130 is adapted to transmit out the second signal S2 converted from the first signal S1 via a wireless way under the control of the first micro-controller 120. The energy harvest sub-unit 140 is adapted to harvest electromagnetic power and to provide electrical power to the first micro-controller 120.

The transceiver unit 100b includes a wireless receiver 150 and an energy transmitter 160. The wireless receiver 150 is adapted to being engaged with the wireless transmitter 130 so as to receive the second signal S2. The energy transmitter 160 is adapted to send out a trigger signal like a continuous SINE wave to the energy harvest sub-unit 140 so that the energy harvest sub-unit 140 can harvest electromagnetic power from the energy transmitter 160 and generate electrical power for supply to the micro-controller 110. Further, the transceiver unit 100b includes a micro-controller (hereinafter referred to as "second micro-controller") 170, which is configured to process the second signal S2 to determine a value of temperature of the electrical conductor based on the received second signal S2. Alternatively, the second micro-controller 170 may be configured to control the energy transmitter 160 to send out the trigger signal.

The energy harvest sub-unit 140 and the energy transmitter 160 are configured to engage with each other and to have a first working frequency. The wireless transmitter 130 and the wireless receiver 150 are configured to engage with each other and to have a second working frequency. The first working frequency is different from the second working frequency. Preferably, ratio of second working frequency to the first working frequency is larger than 100, more preferably larger than 250, or 500, or 1000, or 3000, or 5000, or even larger than 10000. Preferably, the first working frequency is in a range from tens of KHz to hundreds of KHz, preferably less than 1000 KHz, for example from 10 KHz to 990 KHz; even more preferably less than 500 KHz, for example from 10 KHz to 500 KHz, more specific such as on 20 KHz, or on 100 KHz. The second working frequency is in a range from tens of MHz to thousands of MHz, for example from 10 MHz to 10 GHz; preferably larger than 433 MHz, even more preferably from 433 MHz to 2.45 GHz, more specific such as on 433 MHz, or on 2.45 GHz or the alike. Thus, the energy harvest and the signal transmission can be achieved separately and may not disturb each other. Also, the first working frequency is comparatively low, while the second working frequency is comparatively high, the high second working frequency has stronger penetrability and allows for a comparatively free location of the wireless receiver 150, instead of a strict match between the wireless receiver and the wireless transmitter required by existing temperature system in the art. Also, the second working frequency is high enough, so the transmitting distance can be much longer than that under low frequency.

Alternatively, the temperature sensor 110 is configured to be in direct contact or in thermal contact with the electrical conductor. The type of the temperature sensor 110 is not limited, analog and digital temperature sensors that sense and measure temperature with required precise accuracy and reliability is acceptable. The electrical conductor may reach about 90° C., or even higher temperature, so it is desirable that the temperature sensor 110 can work under certain high temperature. As an example, it can be a thermocouple, or a temperature sensitive element, etc. The temperature sensitive element, for example, can be selected from a temperature-sensitive switch, temperature-sensitive inductive coil, temperature-sensitive capacitor, or temperature sensitive resister, and can form a circuit with other electric components to have at least one characteristic parameter representing the temperature of the electrical conduct, as disclosed in PCT/CN2013/075135. Thus, the temperature sensor 110 can detect a signal (the first signal S1) representing temperature of the electrical conductor and output the signal (the first signal S1). This signal can be temperature data, or some other parameters embodying the temperature of the electrical conductor, e.g. resistance of a resister varied with temperature, or capacitance of a capacitor varied with temperature.

Alternatively, the wireless transmitter 130 includes an antenna and a driver circuit. The driver circuit is to drive the antenna to emit out the second signal S2 in a way of high frequency wireless signal. Correspondingly, the wireless receiver 150 includes an antenna and a driver circuit which adapted to drive the antenna to receive the second signal S2.

Alternatively, the energy harvest sub-unit 140 comprises a LC resonant circuit having at least one inductive coil 141 and one capacitor 143 and adapted to generate an AC power once triggered by the energy transmitter 160. Thus, the LC resonant circuit can be triggered to oscillate to generate AC power. Further, the energy harvest sub-unit 140 includes a rectifier circuit 145 adapted to convert the AC power to DC power.

The DC power is preferably stable and is supplied to the first micro-controller 120. Once the first micro-controller 120 is powered, it will work and send out an instruction to the temperature sensor 110. Then the temperature sensor 110 will detect the first signal S1 representing temperature of the electrical conductor and to supply the first signal S1 to the first micro-controller 120. Commonly, the first signal S1 is analog signal. The first micro-controller 120 will process the first signal S1 and convert it into a signal (i.e. the second signal S2) applicable to be transmitted via wireless signal, e.g. a digital signal.

The second micro-controller 170 is configured to receive the second signal S2 and to determine the temperature of the electrical conductor based on the second signal S2. Here, it can be understood that the second signal S2 received by the second micro-controller 170 may be the second signal S2 itself emitted by the wireless transmitter 130, or a signal transformed from the second signal S2 during the transmission process, the term of the second signal S2 is used to represent such signal. If the first signal S1 of the temperature sensor 110 is a temperature value, the second micro-controller 170 can determine the temperature of the electrical conductor by converting the second signal S2 into data to show the temperature value. If the first signal S1 of the temperature sensor 110 is another parameter like capacitance or frequency instead of a temperature value, the second micro-controller 170 may include a table showing the relationship between the temperature of the electrical conductor and such parameter so that the second micro-controller 170 can calculate the temperature from the second signal S2. The second micro-controller 170 may further be configured to make a comparison between the temperature data and a predetermined threshold, if the temperature data is larger than a predetermined threshold, the second micro-controller 170 may send out an alarm signal to indicate that the electrical conductor may work under unsafe condition.

The second micro-controller 170 may further be configured to be connected to and control the energy transmitter 160 to work. When there is a need to measure the temperature of the electrical conductor, the second micro-controller 170 will send an instruction S4 to the energy transmitter 160, and the energy transmitter 160 will emit a trigger signal S6, e.g. a continuous SINE wave, to the energy harvest sub-unit 140 so that the energy harvest sub-unit 140 will oscillate to generate AC power and provide electrical power to the first micro-controller 120. Once the first micro-controller 120 gets power, it will send out an instruction to the temperature sensor 110 to detect the signal S1.

Figure 3:
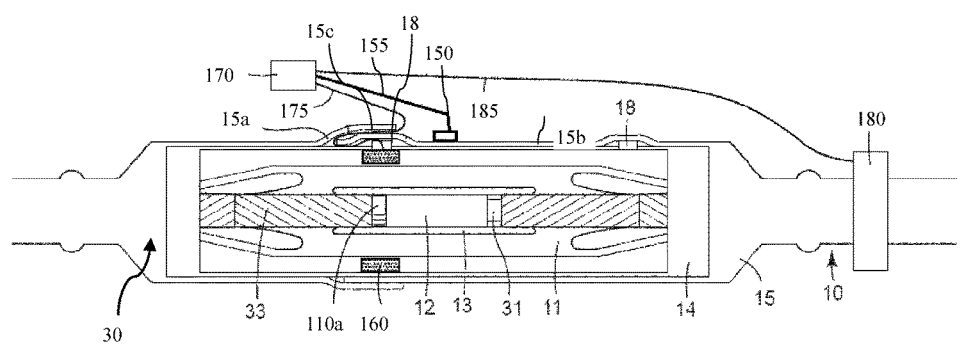
FIG. 3 is a partial cut-away schematic view of application of a system for monitoring temperature of an electrical conductor according to an embodiment of the present invention, in a cable splice assembly.

According to one embodiment of the present invention, as illustrated in FIG. 3, which shows an embodiment of the system for monitoring temperature of an electrical conductor disclosed in the present invention applied to measure the temperature of an electrical conductor 31 enclosed in a cable splice assembly 30. The cable splice assembly 30, as shown in FIG. 1, is commonly used in high voltage power distribution.

In this embodiment, electrical conductor 31 of two cables 10 are spliced and covered by a connector 12 and then are enclosed by a first (semi)conductive layer 13, an insulating layer 11, a second (semi)conductive layer 14, and a shrinkable sleeve layer 15. In this embodiment, the shrinkable sleeve layer 15 includes two overlapping sections 15a and 15b to leave a passage 15c between the overlapping portions. The passage 15c provides an access from the outside of the shrinkable sleeve layer 15 through one port 18 on the second (semi)conductive layer 14 to the inside of the second (semi)conductive layer 14. Therefore, the passage 15c provides access for the communication between the temperature sensor unit 100a and at least portion of components of the transceiver unit 100b.

As shown in FIG. 3, the temperature sensor unit 100a can be positioned close to the electrical conductor 31 and inside the first (semi)conductive layer 13. Preferably, a portion of the electrical conductor 31 is exposed between the insulation layer 33 of the cable 10 and the connector 12, and the temperature sensor unit 100a may be positioned around the exposed portion of the electrical conductor 31. And, alternatively, the temperature sensor 110 can be attached directly on the surface of the connector 12. A frame structure can be provided to be wrapped around the electrical conductor 31, and other components of the temperature sensor unit 100a like the first micro-controller 120, the wireless transmitter 130 and the energy harvest sub-unit 140 can be accommodated by the frame structure. Regarding the transceiver unit 100b, the energy transmitter 160 can be located between the first (semi)conductive layer 13 and the second (semi)conductive layer 14. In order to gain a better communication effect, the energy transmitter 160 can be located right above the energy harvest sub-unit 140 so as to improve the electromagnetic coupling. The second micro-controller 170 can be located outside the second (semi)conductive layer 14. A wire 175 is provided to electrically contact the energy transmitter 160 with the second micro-controller 170. The wire 175 can be accommodated within passage 15c so that the wire 175 can extend from energy transmitter 160, through port 18, to second micro-controller 170. The wireless receiver 150 can be also located outside the second (semi)conductive layer 14. A wire 155 is provided to electrically contact the wireless receiver 150 with the second micro-controller 170. The wireless receiver 150 and the second micro-controller 170 can be installed together or separately, outside the shrinkable sleeve layer 15. As the wireless receiver 150 is configured to work under high frequency and there is no special requirement that it should be located right above the wireless transmitter 130.

Alternatively, another energy harvesting unit 180 including a power inductive coil can be located outside the assembly 30 and around the cable 10, or located between the second (semi)conductive layer 14 and the shrinkable sleeve layer 15. This energy harvesting unit 180 can be used to supply power to the second micro-controller 170 through wire 185.

Throughout this specification, although wire 155, 175, 185 are each referred to as a "wire," it should be understood that either or both of wire 155, 175, 185 may comprise multiple wires as needed for the system to function.

According to another embodiment of the present disclosure, a method of monitoring temperature of an electrical conductor enclosed in at least a first (semi)conductive layer is provided. The method will be described in combination with the system 100 described above. The method includes the steps as below.

The energy harvest sub-unit 140 harvests electrical power and provides the electrical power to the first micro-controller 120. Alternatively, the energy harvest sub-unit 140 is triggered by the energy transmitter 160 to oscillate to generate AC power, and the AC power is converted into DC power by the rectifier circuit 145 before providing to the first micro-controller 120. As disclosed above, the energy harvest sub-unit 140 works at the first working frequency in a range from tens of KHz to hundreds of KHz.

The temperature sensor unit 110 detects the first signal representing temperature of the electrical conductor and provides the first signal to the first micro-controller 120. Alternatively, the temperature sensor unit 110 works under the control of the first micro-controller 120. For example, the first micro-controller 120 may send out an instruction to the temperature sensor unit 110 and the temperature sensor unit 110 will start to detect the first signal. The first micro-controller 120 then converts the first signal into the second signal applicable of being transmitted via a wireless way.

Then, the wireless transmitter 130 transmits the second signal to the wireless receiver 150 via a wireless way and the wireless transmitter 130 works on the second working frequency, e.g. in a range from tens of MHz to thousands of MHz. Preferably, ratio of the second working frequency to the first working frequency is larger than 100. Thus, the energy harvest and the signal transmission can be achieved separately and may not disturb each other. Then, the wireless receiver 150 provides the received second signal to the second micro-controller 170 and the second micro-controller 170 determines the temperature of the electrical conductor based on the second signal.

Although some embodiments for the general concept of the present disclosure have been shown and explained, the skilled person in the art will appreciate that modifications to the above embodiments can be carried out without departing from the spirit and principle of the present general inventive concept. The scope of the present disclosure should be defined by the appended claims and equivalents thereof.

What is claimed is:

1. A system for monitoring temperature of an electrical conductor enclosed in at least a first semi-conductive layer, the system comprising:
   a temperature sensor unit located inside the first semi-conductive layer, and comprising a micro-controller, a temperature sensor, an energy harvest sub-unit and a wireless transmitter, and the temperature sensor adapted to detect a first signal representing temperature of the electrical conductor and to supply the first signal to the micro-controller; and
   a transceiver unit located outside the first semi-conductive layer and comprising an energy transmitter and a wireless receiver;
   wherein, the energy harvest sub-unit is adapted to harvest electromagnetic power from the energy transmitter and to provide electrical power to the micro-controller;
   the wireless transmitter is adapted to being engaged with the wireless receiver under the control of the micro-controller to transmit a second signal converted from the first signal to the wireless receiver; and
   the energy harvest sub-unit and the wireless transmitter are designed to have different working frequency, wherein a ratio of the working frequency of the wireless transmitter to that of the energy harvest sub-unit is larger than 100, wherein the energy harvest sub-unit has a working frequency in a range from 10 KHz to 990 KHz, and wherein the wireless transmitter has a working frequency in a range from 10 MHz to 10 GHz.

2. The system according to claim 1, wherein the energy harvest sub-unit comprises a LC resonant circuit adapted to generate an AC power after triggered by the energy transmitter.

3. The system according to claim 2, wherein the energy harvest sub-unit comprises a rectifier circuit adapted to convert the AC power to DC power.

4. The system according to claim 1, wherein the temperature sensor is in direct contact or in thermal contact with the electrical conductor.

5. The system according to claim 1, wherein the first semi-conductive layer is enclosed by a second semi-conductive layer, the energy transmitter is located between the first semi-conductive layer and the second semi-conductive layer.

6. The system according to claim 5, wherein the transceiver unit comprises a micro-controller located outside the second semi-conductive layer and connected with the energy transmitter via a wire.

7. The system according to claim 6, wherein the wireless receiver is adapted to be located outside the second semi-conductive layer and to communicate with the micro-controller of the transceiver unit.

8. The system according to claim 7, wherein the micro-controller of the transceiver unit is configured to determine the temperature of the electrical conductor based on the received second signal.

9. A method of monitoring temperature of an electrical conductor enclosed in at least a first semi-conductive layer, comprising the steps of:
   harvesting electrical power and providing the electrical power to a first micro-controller by an energy harvest sub-unit working on a first working frequency, the first micro-controller and the energy harvest sub-unit located inside the first (semi)conductive layer;
   detecting a first signal representing temperature of the electrical conductor by a temperature sensor unit located inside the first semi-conductive layer;

converting the first signal by the first micro-controller into a second signal applicable of being transmitted via a wireless way; and transmitting the second signal by a wireless transmitter to a wireless receiver located outside the first semi-conductive layer, the wireless transmitter located inside the first semi-conductive layer and working on a second working frequency different from the first working frequency, wherein a ratio of the second working frequency to the first working frequency is larger than 100, wherein the energy harvest sub-unit has a working frequency in a range from 10 KHz to 990 KHz, and wherein the wireless transmitter has a working frequency in a range from 10 MHz to 10 GHz.

10. The method according to claim 9, wherein the harvesting step includes a sub-step of emitting a trigger signal by an energy transmitter located outside the first semi-conductive layer to trigger the energy harvest sub-unit to oscillate to generate AC power.

11. The method according to claim 9, comprising the step of determining the temperature of the electrical conductor based on the second signal by a second micro-controller located outside the first semi-conductive layer.

* * * * *

UNITED STATES PATENT AND TRADEMARK OFFICE
CERTIFICATE OF CORRECTION

PATENT NO. : 10,378,965 B2  
APPLICATION NO. : 15/021290  
DATED : August 13, 2019  
INVENTOR(S) : Denny Wen et al.

Page 1 of 1

It is certified that error appears in the above-identified patent and that said Letters Patent is hereby corrected as shown below:

On the Title Page

Item (71), APPLICANTS, delete "Zhiguo Wen, Shanghai (CN)"

Signed and Sealed this  
Tenth Day of December, 2019

Andrei Iancu  
*Director of the United States Patent and Trademark Office*